Feb. 26, 1952   D. P. HYNES   2,586,950
FITTING
Filed May 4, 1950
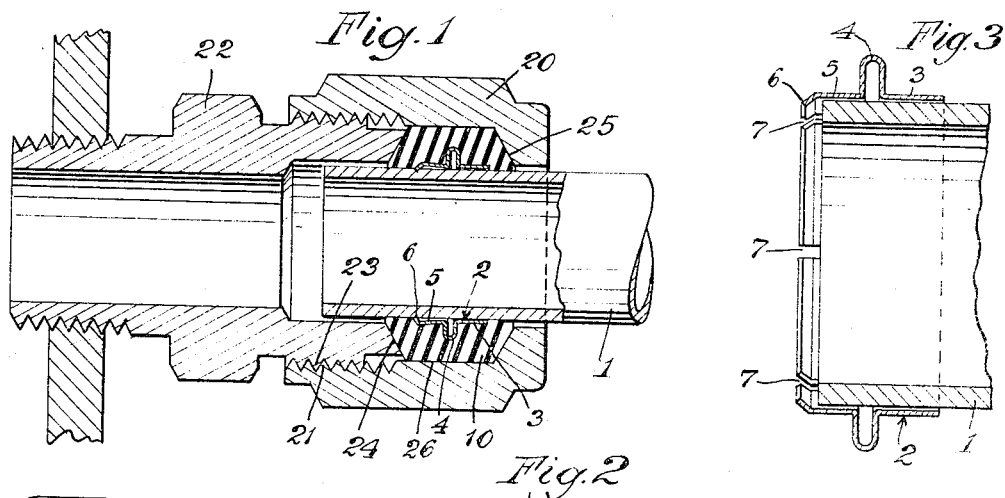
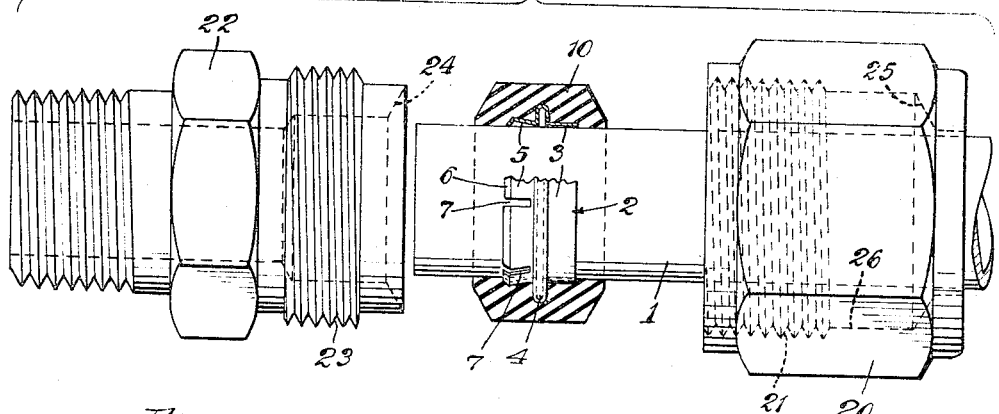
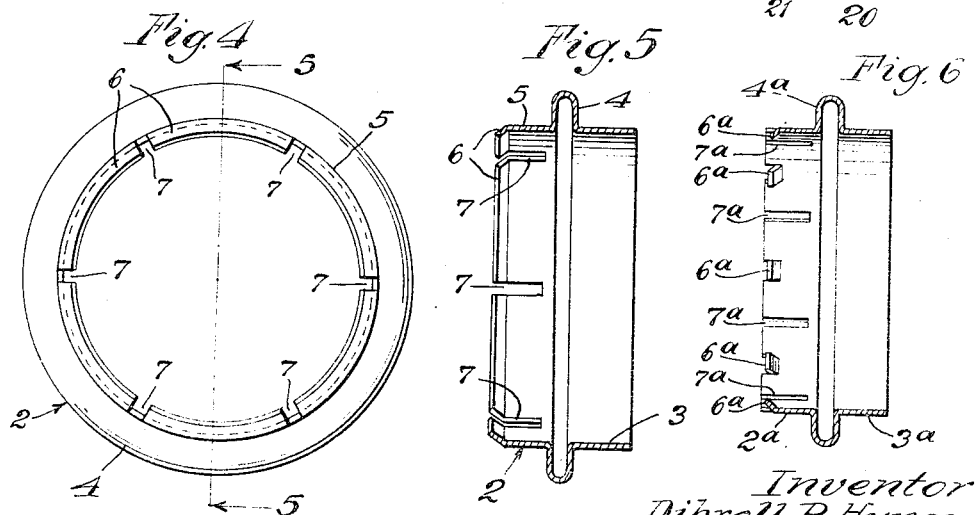
Inventor
Dibrell P. Hynes
by Parker & Carter
Attorneys.

Patented Feb. 26, 1952

2,586,950

UNITED STATES PATENT OFFICE 2,586,950

FITTING

Dibrell P. Hynes, Evanston, Ill., assignor to Chicago Forging and Manufacturing Company, Chicago, Ill., a corporation of Delaware Application May 4, 1950, Serial No. 160,055

6 Claims. (Cl. 285—122)

My invention relates to an improvement in fittings or connections for tubing.

One purpose is to provide a fitting or connection whereby tubing, including relatively thin tubing, can be secured.

Another purpose is to provide such a fitting in which a measure of flexibility of the tubing in relation to the fitting is permitted.

Another purpose is to provide an improved ferrule for such fittings.

Another purpose is to provide a ferrule effective for such connections, and also useful in connections which have to take substantial pressures, the pressures to which such fittings are subjected ranging from negative pressures to pressures of several thousand pounds per square inch.

Other purposes will appear from time to time in the course of the specification and claims.

I illustrate the invention more or less diagrammatically in the accompanying drawings, wherein:

Fig. 1 is a vertical section through a tube end illustrating the fitting in place;

Fig. 2 is a side elevation, with parts broken away and parts in section illustrating the disassembled parts of my connection or fitting;

Fig. 3 is an axial section on an enlarged scale illustrating the initial relationship between the ferrule and the tube end;

Fig. 4 is an end elevation of the ferrule;

Fig. 5 is a section on the line 5—5 of Fig. 4; and

Fig. 6 is a view similar to Fig. 5 through a variant form of the device.

Like parts are indicated by like symbols throughout the specification and drawings.

Referring to the drawings, 1 generally indicates a tube end. 2 generally indicates a ferrule having a solid cylindrical sleeve portion 3 which, as shown, for example, in Fig. 3, is of an interior diameter not less than the exterior diameter of the tube 1. 4 is a projection shown in the form of a circumferential rib. At the opposite side of the rib is a generally circumferential portion 5 which generally may be concentric with and of the same diameter as the portion 3. However, it terminates in an inwardly bent lip 6 and is slotted as at 7, the slots extending through the lip portion 6 and into the cylindrical portion 5.

10 indicates a surrounding washer or ring of rubber or a suitable rubber substitute which is flexible and distortable. In making a connection, the rubber-like washer 10 is slipped over the ferrule 2 either before or after the application of the ferrule to the tube end 1. The washer 10 is then subjected to pressure effective to compress it firmly against the surface of the tube 1. I illustrate, for example, a pressure fitting in which a nut 20 is insertably threaded as at 21 to receive exterior threaded portion 23 of a fitting 22. The member 22 is shown as terminating in an end surface 24 while the hollow nut 20 has an opposed surface 25 and a connecting surface 26.

It will thus be seen, as in Fig. 1, that when the members 20 and 22 are screwed together, they provide a pressure chamber in which the rubber-like ring 10 is confined. Under compression, the entire interior of the pressure chamber is filled by the ring 10, which can be put under substantial pressure by relative rotation of the members 20 and 22. It will be clear from the drawings that the lip formed by the slotted end of the ferrule has edges which are initially, definitely smaller than the outside diameter of the tube 1, whereby an initial and substantial bite on the tube is provided. As a result, under the additional pressure provided by the relative movement of the members 20 and 22, the inner surface of the ring 10 is firmly thrust against the tube 1 at opposite sides or edges of the ferrule. At the same time, the ferrule is subjected to sufficient pressure to urge the lip inwardly against and even into the exterior surface of the tube 1. It is advantageous, but not strictly necessary, to pre-form or contour the interior of the ring 10, to conform to the exterior of the ferrule, and, in particular, to the rib 4. It is preferable to sharpen or harden the edge of the lip 6 of the ferrule or to form the ferrule of material somewhat harder than the tubing 1. In any event, the pressure to which the ring 10 is subjected, in connection with its initial formation to exert an initial and substantial bite, is effective to force the lip 6 to dig into or enter in the surface of the tube. This inter-penetration, taken in connection with the pressure of the ring 10, is effective to permit the tubing 1 to resist very substantial endwise strain. The ring 10 is thereby positioned against undesired, endwise movement on the tube 1. It also serves as an effective seal to contain pressures which may vary from negative to high. Since there is a clearance between the exterior of the tube 1 and the surrounding surfaces of the fitting elements 20 and 22, a slight flexure of the tube 1 is permitted without causing a metal-to-metal contact. Thus, not merely does the fitting seal against a wide range of pressures, but it also permits slight flexure of the tube 1 during maintenance of such pressures. The avoidance of metal-to-metal contact prevents noise, wear and fatiguing of the parts which might result in eventual breakage.

Referring to the form of Fig. 6, I illustrate a ferrule having tubular portions 2a and 3a, connected by an outwardly extending rib 4a. The portion 2a is shown as slotted at 7a to divide it into a series of tongues. However, instead of turning over the entire tongue edge, as at 6 in Fig. 5, I prefer to strike out or form an intermediate, supplemental tongue or tooth 6a in each of the major tongues formed by the slots 7a.

It will be realized that, whereas I have described and claimed a practical and operative device, nevertheless, many changes may be made in size, shape, number and disposition of parts without departing from the spirit of my invention. I therefore wish my description and drawings to be taken as in a broad sense illustrative or diagrammatic rather than as limiting me to my specific showing herein.

The use and operation of the invention are as follows:

Fittings of the type herein shown may be used in liquid fuel or lubricant transmission lines as in connection with motors on airplanes, etc. They are effective in automotive products. They have a wide application in refrigeration. While the fitting shown can be made to resist very high pressures by suitable binding and by the use of proper yielding materials, it is equally useful at low pressures, or even at negative pressures.

In the operation of the device, for example, where the interior of the tube 1 is subjected to high pressure, this internal pressure tends to force the tube outwardly through the fitting. In other words, annd referring to Figure 1, an internal pressure tends to move the tube 1 to the right. This slight movement or tendency to move assists in the locking action, as the movement of the tube, in connection with the heavy thrust inwardly against the ferrule, tends, additionally, to force the edge of the lip 6 into the surface of the tube.

It will be understood that it is advantageous to have the split skirt 5 and the lip 6 combined to form an element exerting an initial pressure against the exterior of the tube. As will be clear from Figure 3, while the inner diameter of the member 5 may slightly exceed the exterior diameter of the tube, the inwardly curved portion 6 has to be cammed or thrust outwardly to permit the passage of the tube M. Thus, although the ferrule is solid or non-split, the spring teeth thus formed are initially biased to exert an inward thrust against the outer surface of the tube 1. Preferably, the ferrule is of metal having the characteristics of sheet metal spring stock with a relatively sharp edge along the lip 6.

I claim:

1. For use with tubing fittings comprising a compression chamber and an elastic sealing ring, a tube, a solid ferrule havinng a relatively sharp edge portion adapted, on tightening of the compression chamber, to bite into the surface of the tube, thus anchoring the fitting to the tube, the ferrule being of harder material than the tube and including a flexible lip portion separated by slots into a plurality of tongue segments, said compression chamber including interpenetrating portions adapted, upon relative movement, to subject the elastic sealing ring to pressure adequate to force the edges of the tongue portions of the ferrule into the surface of the tube, the ferrule including a solid, outwardly extending, circumferential projecting portion surrounded by the elastic ring and adapted to prevent relative endwise movement of the tube and of the compression chamber when the ferrule is in biting engagement with the tube.

2. The structure of claim 1 in which the exterior surface of the tube is at all points out of contact with the inner surfaces of the compression member, whereby the elastic sealing ring constitutes the sole connection between the compression member and the tube.

3. The structure of claim 1 characterized by and including a ferrule having, at one end, a solid, generally cylindrical portion and having, at the other end, a plurality of individually flexible tongues spaced circumferentially around the ferrule, the solid portion of the ferrule including a concavo-convex, circumferential rib.

4. The structure of claim 1 characterized by and including a ferrule, the tongue segments of which have edges initially radially spring-biased against the exterior of the tube, the solid ferrule portion having an internal diameter not less than the external diameter of the tube.

5. The structure of claim 1 characterized by and including flexible lip portions, the tongue segments of which are provided with inwardly extending teeth.

6. The structure of claim 1 characterized by and including flexible lip portions, the tongue segments being initially radially spring-biased against the exterior of the tube.

DIBRELL P. HYNES.

REFERENCES CITED

The following references are of record in the file of this patent:

UNITED STATES PATENTS

| Number | Name | Date |
|---|---|---|
| Re. 22,713 | Howe | Jan. 22, 1946 |
| 1,440,207 | Burns | Dec. 22, 1922 |
| 1,822,056 | Noble | Sept. 8, 1931 |
| 2,475,026 | Hynes et al. | July 5, 1949 |